Sept. 13, 1960
C. BOLLE
2,952,675
PROCESS OF RECOVERING EPSILON-CAPROLACTAM FROM ITS POLYMER
Filed July 1, 1958
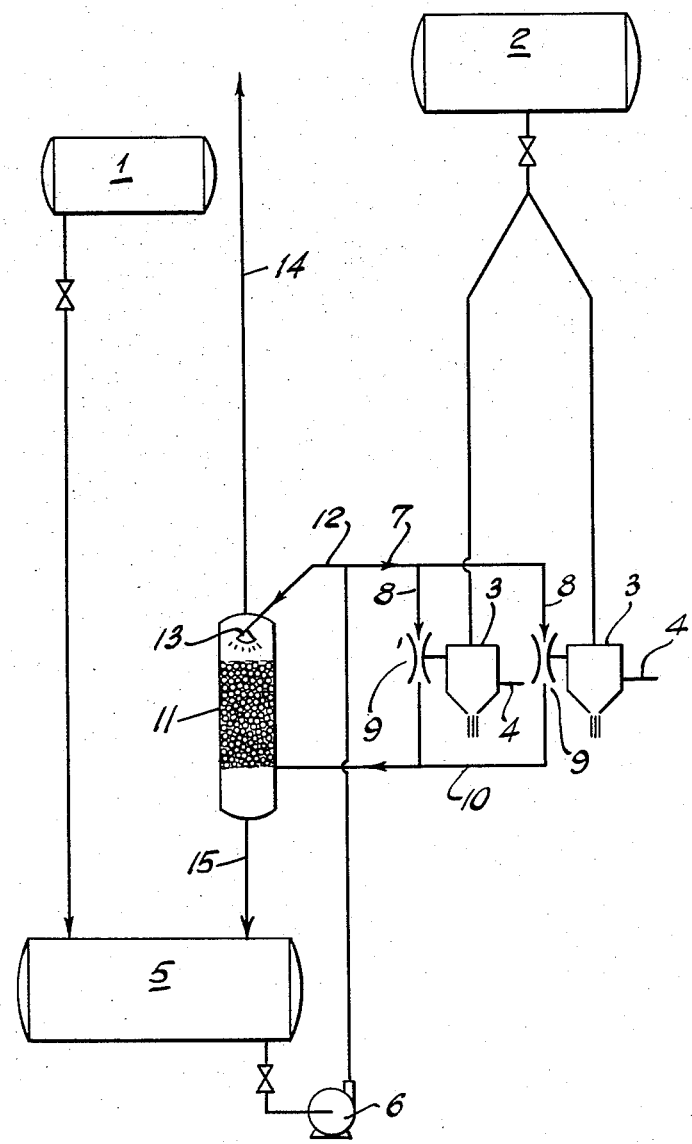
INVENTOR
CHARLES BOLLE
BY
ATTORNEYS

United States Patent Office 2,952,675
Patented Sept. 13, 1960

2,952,675

PROCESS OF RECOVERING EPSILON-CAPROLACTAM FROM ITS POLYMER

Charles Bolle, Domat-Ems, Grb., Switzerland, assignor to Inventa, A.-G., fur Forschun, und Patent-verwertung Luzern, Lucerne, Switzerland Filed July 1, 1958, Ser. No. 745,927

7 Claims. (Cl. 260—239.3)

The present invention relates to the process of recovering epsilon-caprolactam from its polymer.

In the polymerization of epsilon-caprolactam, useful for example in the production of synthetic fibers or filaments, heat is employed in a first stage in the presence of water and under pressure until a polymer of low molecular weight is formed from the lactam. In a second stage, further heat is employed, at first without pressure and later under vacuum to remove the volatile constituents, such as water and epsilon-caprolactam. As a result of this process, there is obtained in addition to the polymer a dilute epsilon-caprolactam solution. The recovery of the epsilon-caprolactam from this solution by distillation is not economical.

The monomeric lactam should not be left with the polymer, since it produces an inferior synthetic filament or other final polymeric product. According to the spinning process described in Swiss Patent 265,481 and United States Patent 2,687,552 for polycaprolactam, it is proposed that the epsilon-caprolactam left in the polymer be vaporized from thin stratifiers immediately prior to the spinning and be evaporated with the aid of inert gases as carrier agents. According to this process, the vapors of epsilon-caprolactam contained in the inert circulating gases are supposed to be condensed in a cooler. However, it has been found from experience, that the pipes along which the inert gases travel are often clogged by condensation of the epsilon-caprolactam contained in them. This leads to undesirable interruptions in operation.

One object of the present invention is to provide a new and improved method of economically recovering epsilon-caprolactam from its polymer without the drawbacks of the prior art described.

It has been found in accordance with the present invention that epsilon-caprolactam can be recovered from inert gases in a simple manner by washing these out with water.

According to the process of the invention, the washing out of caprolactam from inert gases is done with aqueous lactam solutions. For that purpose, use is advantageously made of the dilute aqueous lactam solution, which is produced during the polymerizing stage and which by appropriate means, such as a sprinkler or injector is pumped into the pipe conducting the inert gases carrying the epsilon-caprolactam vapors. The injection of the aqueous lactam solution is best accomplished at the outlet of the pipe conducting the inert gases from the thin layer vaporizers, so that heating of the inert gas pipe is not required. The injected aqueous lactam solution is conducted together with the inert gas into a separating tower, which desirably is provided with surface-enlarging filling bodies, where the separation of the lactam solution from inert gas takes place, and at the same time the condensed cloud-like or smoke-like lactam particles existing in the gas are washed out. Success is attained in this way by cyclic recirculation of the lactam solution, bringing it to any desired concentration without distillation. The inert gas may also be used repeatedly under certain circumstances by heating it again and refeeding it cyclically to the vaporizers, though when this is done, care must be taken to make it as free as possible from oxygen.

The lactam solution so obtained, if it is not contaminated by any special additions originating from the polymerization water can be used directly again for polymerization.

Various other objects and features of the invention are apparent from the following description and from the accompanying drawing, showing a flow sheet for carrying out the process of the present invention. The following specific examples may be carried out in the apparatus shown in this drawing.

Example 1

In a reaction vessel, 99.5 parts of epsilon-caprolactam and 0.5 part of water with the addition of 0.6 part of sebacic acid as chain-breaking agent are polymerized for 14 hours in the well-known manner in the absence of oxygen, and the resulting product is partly freed from monomeric lactam during the vacuum stage of the polymerization. The monomeric lactam is partly removed from the polymer in the form of a 45% aqueous lactam solution which is collected in a tank 1. The polymeric melt is forced by means of an inert gas, which in the specific example is nitrogen, out of the reaction vessel and into a melt equalizing vessel 2 from which the melt still containing 11% low-molecular constituents, is fed by means of a feed pump with a flow of 36 gr./min. into a spinning head having a thin layer surface evaporizer 3 with 1.2 m.² of vaporizing surface. Two of these spinning heads and associated evaporizers 3 are shown connected at the outlet of the vessel 2 for the purpose of illustration, but it must be understood that a bank of any number of these spinning head-evaporator units may be provided.

At an excess pressure of 150 mm. of water column, monomeric caprolactam constituents are removed from the melt in evaporator 3 by means of nitrogen as the carrier inert gas delivered continuously into the evaporator by means of a pipe 4, so that this melt with a content of 5% of low molecular constituents can be spun into filaments or fibers.

The volatile epsilon-caprolactam carried by the nitrogen gas is condensed by continuously recirculating in contact therewith the 45% aqueous lactam solution which originates from the final phase of the polymerization step and which is discharged from tank 1 into tank 5. The epsilon-caprolactam so condensed is dissolved in the epsilon-caprolactam solution. These operations are carried out in accordance with the present invention by pumping the 45% lactam solution from the tank 5 by means of a pump 6 through pipes 7 and 8 into the injectors 9 and into contact with the lactam-containing nitrogen gas emerging from the vaporizers 3. The mixture of nitrogen gas and lactam solution from the outlets of the injector 9 are admitted by pipes 10 into a separating tower 11 containing a mass of surface enlarging filling bodies. At the same time, lactam solution is fed from the tank 5 by means of the pump 6 and the line 12 to a sprinkler 13 at the head end of the separating tower 11. The lactam solution from the sprinkler 13 descending through the mass of surface enlarging filling bodies in the separator 11, meets the ascending nitrogen gas carrying the vaporized lactam, thereby causing the vaporized lactam to be condensed in cloud-like or smoke-like form and to be dissolved in the descending lactam solution. This lactam solution with the additional dissolved lactam is discharged from the separating tower 11 through the pipe 15 and is returned to the tank 5 from which it is recirculated by means of the pump 6 in the manner and for the purpose described to the injectors 9 and the sprinkler 13. The nitrogen gas from which the entrained vaporized lactam has been removed is discharged from the upper end of the separating tower 11 through a pipe 14. The lactam solution from the tank 5 is recycled as described for a period of time, until the solution has a concentration of 85% by weight of lactam. The aqueous lactam solution concentrated in this manner and to this degree is purified by distilling and is again fed to the polymerizing zone.

*Example 2*

In a pressure vessel, a mixture of 90 parts of epsilon-caprolactam, 10 parts of water and 0.3% of acetic acid as a chain-breaking agent is polymerized in the absence of oxygen for a period of 12 hours in a well-known manner, and the product is made free of water and partly free of volatile lactam constituents. The polymer melt is then discharged into a melt equalizing vessel heated to 260° C. From this vessel, the melt which contains about 10.5% of low-molecular components is distributed among 8 spinning heads of a spinning machine. The spinning heads are provided with thin layer surface vaporizers, each having 1.2 m.$^2$ of vaporizing surface and each maintained at a temperature of 260° C. Feed pump and spinning pump are adjusted to a performance of 120 gr./min. through the spinning heads. At an excess pressure of 100 mm. of water column, 4.5% by weight of volatile lactam components are expelled from the melt in each vaporizer and carried by the previously heated nitrogen gas conducted through the vaporizer, and the melt as a result of this operation, low in monomers, is spun into polyamide fibers.

The volatile monomeric components which are practically pure epsilon-caprolactam, are precipitated in a collecting pipe by atomized water and are dissolved in said water, and the dilute aqueous monomeric lactam solution thus formed is continuously recirculated through an interceptor where the nitrogen is separated and is concentrated to a content of 90% by weight of epsilon-caprolactam. The concentrated epsilon-lactam solution so obtained can be subjected again to polymerizing action without further purification and be spun.

Except as otherwise indicated, the process of Example 2 can be carried out in an apparatus similar to that shown in the drawing and described in connection with Example 1.

While the invention has been described with particular reference to a specific embodiment, it is to be understood that it is not to be limited thereto, but is to be construed broadly and restricted solely by the scope of the appended claims.

What is claimed is:

1. A process for recovering epsilon-caprolactam from its equilibrium polymer, which comprises feeding the polymer into a thin layer surface vaporizer while passing an inert carrier gas in said vaporizer to vaporize the epsilon-caprolactam and to carry it along with said gas, and introducing an aqueous medium into the inert gas containing the vaporized epsilon-caprolactam to wash the epsilon-caprolactam out of the inert gas by condensing the epsilon-caprolactam and dissolving the condensed epsilon-caprolactam in the water.

2. The process as described in claim 1, wherein said washing of the inert gas is carried out with aqueous epsilon-caprolactam solution.

3. The process as described in claim 2, wherein the aqueous epsilon-caprolactam solution employed in the washing of the inert gas is that occurring in the vacuum stage of the polymerization.

4. The process as described in claim 2, wherein the aqueous epsilon-caprolactam solution employed in the washing of the inert gas is that occurring in the polymerization stage and the aqueous solution is recirculated repeatedly until it has a concentration of between 85% and 90% by weight of lactam.

5. A process for recovering epsilon-caprolactam from its equilibrium polymer, which comprises separating the epsilon-caprolactam from the polymer in the form of an aqueous solution, passing the polymer through a vaporizer and at the same time admitting inert gas into said vaporizer to vaporize the epsilon-caprolactam mixed with the polymer and to entrain it in said gas, washing the entrained gas with said aqueous solution in a washing zone to condense the epsilon-caprolactam from said gas and to dissolve the condensed epsilon-caprolactam in the aqueous solution, while the inert gas is separated from the aqueous solution, whereby the concentration of the epsilon caprolactam in the aqueous solution is increased, and recirculating the aqueous solution through the washing zone until an aqueous solution having a high concentration of epsilon-caprolactam is produced.

6. A process for recovering epsilon-caprolactam from its equilibrium polymer, which comprises feeding the polymer into a thin layer surface vaporizer while passing an inert carrier gas in said vaporizer to vaporize the epsilon-caprolactam and to carry it along with said gas, and subjecting the vaporized epsilon-caprolactam while in said carrier gas to an aqueous spray to dissolve the epsilon-caprolactam and wash it out of the carrier gas.

7. A process as in claim 6 wherein said aqueous spray is atomized water.

References Cited in the file of this patent

UNITED STATES PATENTS

| | | |
|---|---|---|
| 2,810,630 | Herle | Oct. 22, 1957 |

FOREIGN PATENTS

| | | |
|---|---|---|
| 531,177 | Canada | Oct. 2, 1956 |
| 775,888 | Great Britain | May 29, 1957 |